(12) United States Patent
Hayashi

(10) Patent No.: US 9,952,382 B2
(45) Date of Patent: Apr. 24, 2018

(54) MULTI-CORE OPTICAL FIBER, MULTI-CORE OPTICAL FIBER CABLE, AND OPTICAL FIBER TRANSMISSION SYSTEM

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/284,713

(22) Filed: Oct. 4, 2016

(65) Prior Publication Data

US 2017/0102501 A1    Apr. 13, 2017

Related U.S. Application Data

(63) Continuation of application No. PCT/JP2016/074869, filed on Aug. 25, 2016.

(30) Foreign Application Priority Data

Oct. 8, 2015 (JP) ................................. 2015-199996
Mar. 18, 2016 (JP) ................................. 2016-055424

(51) Int. Cl.
*G02B 6/02* (2006.01)

(52) U.S. Cl.
CPC ..... *G02B 6/02042* (2013.01); *G02B 6/02214* (2013.01); *G02B 6/02271* (2013.01)

(58) Field of Classification Search
CPC ........... G02B 6/02042; G02B 6/02271; G02B 6/02214
See application file for complete search history.

(56) References Cited

U.S. PATENT DOCUMENTS

| | | | |
|---|---|---|---|
| 2013/0039627 A1 | 2/2013 | Li et al. | |
| 2013/0251320 A1* | 9/2013 | Hayashi | G02B 6/02042 385/100 |
| 2013/0301998 A1* | 11/2013 | Hayashi | G02B 6/02042 385/100 |

FOREIGN PATENT DOCUMENTS

WO    WO-2013/161825 A1    10/2013

OTHER PUBLICATIONS

Shanhui Fan et al., "Principal modes in multimode waveguides," Optics Letters, 2005, pp. 135-137, vol. 30, No. 2.
(Continued)

*Primary Examiner* — John M Bedtelyon
(74) *Attorney, Agent, or Firm* — Drinker Biddle & Reath LLP

(57) ABSTRACT

The present embodiment relates to an MCF in which the strength of mode coupling or power coupling between adjacent cores included in one coupled-core group is set to an appropriate level to reduce a DGD. The MCF includes at least one coupled-core group. A core interval Λ between adjacent cores included in the coupled-core group is set such that a mode coupling coefficient between the adjacent cores at a wavelength of 1550 nm satisfies $2.6 \times 10^0$ [m$^{-1}$] to $1.6 \times 10^2$ [m$^{-1}$] or a power coupling coefficient between the adjacent cores at the wavelength of 1550 nm satisfies $1.3 \times 10^{-3}$ [m$^{-1}$] to $8.1 \times 10^0$ [m$^{-1}$].

13 Claims, 8 Drawing Sheets

(56) References Cited

OTHER PUBLICATIONS

Masamori Koshiba et al., "Analytical Expression of Average Power-Coupling Coefficients for Estimating Intercore Crosstalk in Multicore Fibers," IEEE Photonics Journal, 2012, pp. 1987-1995, vol. 4, No. 5.

Tetsuya Hayashi et al., "Physical interpretation of intercore crosstalk in multicore fiber: effects of macrobend, structure fluctuation, and microbend," Optics Express, 2013, pp. 5401-5412, vol. 21, No. 5.

Tetsuya Hayashi et al., "Coupled-Core Multi-Core Fibers: High-Spatial-Density Optical Transmission Fibers with Low Differential Modal Properties," ECOC, 2015, ID: 0318, Sep. 27, 2015, pp. 4.

Keang-Po Ho et al., "Statistics of Group Delays in Multimode Fiber With Strong Mode Coupling," Journal of Lightwave Technology, Nov. 1, 2011, pp. 3119-3128, vol. 29, No. 21.

Mahdieh B. Shemirani et al., "Principal Modes n Graded-Index Multimode Fiber in Presence of Spatial- and Polarization-Mode Coupling," Journal of Lightwave Technology, May 15, 2009, pp. 1248-1261, vol. 27, No. 10.

R. Ryf et al., Impulse Response Analysis of Coupled-Core 3-Core Fibers, ECOC 2012, Mo.1.F.4.pdf, Sep. 16, 2012, pp. 4.

R. Ryf et al., "1705-km transmission over coupled-core fibre supporting 6 spatial modes," ECOC 2014, PD.3.2, Sep. 21, 2014, pp. 3.

* cited by examiner

MULTI-CORE OPTICAL FIBER, MULTI-CORE OPTICAL FIBER CABLE, AND OPTICAL FIBER TRANSMISSION SYSTEM

CROSS-REFERENCE TO RELATED APPLICATIONS

This application is a continuation application of PCT/JP2016/074869 claiming the benefit of priority of the Japanese Patent Application No. 2015-199996 filed on Oct. 8, 2015 and the Japanese Patent Application. No. 2016-055424 filed on Mar. 18, 2016, the entire contents of which are incorporated herein by reference.

TECHNICAL FIELD

The present invention relates to a multi-core optical fiber (hereinafter, referred to as the "MCF"), an MCF cable, and an optical fiber transmission system including the MCF or the MCF cable.

BACKGROUND

Recently, an optical fiber transmission system that compensates for crosstalk between spatial modes using multi-input and multi-output (MIMO) signal processing technology and performs space-division multiplex transmission is developed. As an example of transmission media applicable to the optical fiber transmission system, an MCF with a coupled-core group in which a plurality of cores are arranged such that mode coupling is generated is known. The coupled-core group can be regarded as one multi-mode transmission path substantially by generating the mode coupling between the plurality of cores.

SUMMARY

The inventors have found the following problems as an examination result of the MCF with the coupled-core group applicable to the optical fiber transmission system according to the related art. That is, in the case of spatial multiplex transmission using the optical fiber transmission system according to the related art, it is necessary to reduce a differential group delay (DGD) between the spatial modes to suppress a load increase of the MIMO signal processing. As far as the inventors know, when a core interval between adjacent cores in the coupled-core group decreases in the MCF in which random mode coupling is generated, the DGD between the spatial modes also decreases. However, it has not known that the DGD between the spatial modes increases when the core interval excessively decreases.

In other words, it has not known that linearity of the core interval and the DGD between the spatial modes is impaired when a degree of the mode coupling between the cores constituting the coupled-core group excessively increases. That is, it is thought that an accumulation of the DOD between the spatial modes becomes gentle, because a lot of random mode coupling is generated discretely along a fiber longitudinal direction, due to fiber bending and fiber torsion, in the coupled-core group in which an appropriate core interval is set. Meanwhile, it is thought that, when the core interval extremely decreases, perturbation applied from the fiber bending and the fiber torsion to coupling between the cores becomes smaller than the strength of the mode coupling between the cores and finally, the random mode coupling becomes hard to be generated and the accumulation of the DOD between the spatial modes increases.

The present invention has been made to resolve the above problems and an object of the present invention is to provide an MCF in which the strength of mode coupling or power coupling between adjacent cores in a coupled-core group included in the MCF is set to an appropriate level to reduce a DGD between spatial modes, an MCF cable, and an optical fiber transmission system including the MCF or the MCF cable.

An MCF according to the present embodiment is an MCF that comprises: at least one coupled-core group constituted by a plurality of cores; and a common cladding surrounding the coupled-core group. In the MCF, a core interval $\Lambda$ between centers of adjacent cores among the plurality of cores is set such that a mode coupling coefficient between the adjacent cores at a wavelength of 1550 nm is $2.6 \times 10^0$ $[m^{-1}]$ to $1.6 \times 10^2$ $[m^{-1}]$ or a power coupling coefficient between the adjacent cores at the wavelength of 1550 nm is $13 \times 10^{-3}$ $[m^{-1}]$ to $8.1 \times 10^0$ $[m^{-1}]$. Here, the mode coupling coefficient is a coupling ratio of complex amplitude component from a certain mode to other mode during propagation per a unit length and is defined by a formula (2). The power coupling coefficient is a ratio of power of a component coupled to other mode from a certain mode during propagation per a unit length.

BRIEF DESCRIPTION OF THE DRAWINGS

FIG. 5A is a graph illustrating a relation of a parameter b of a formula (1) and DGD/a.

DETAILED DESCRIPTION

Description of Embodiment of Present Invention

Figure 1:
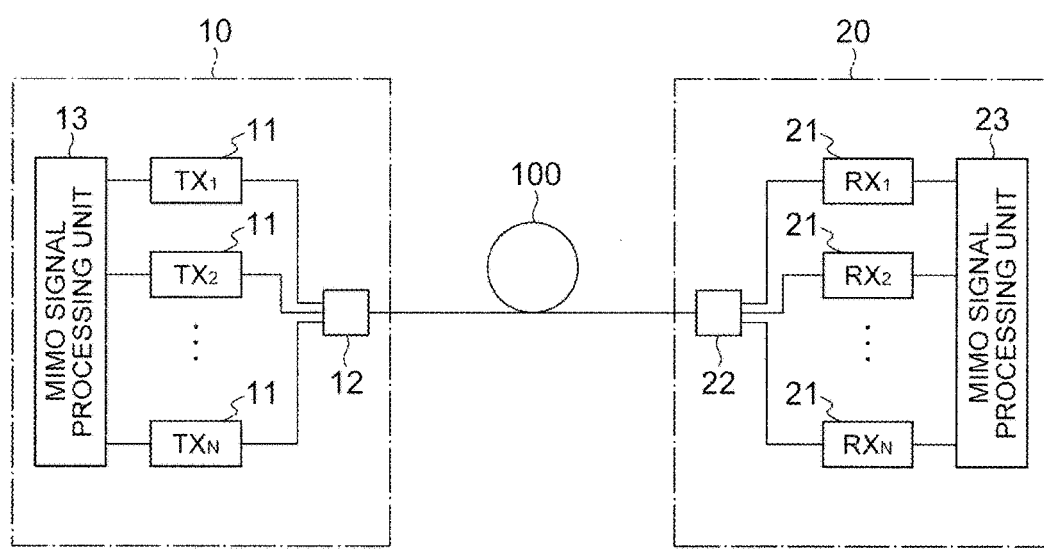
FIG. 1 is a diagram illustrating a schematic configuration of an optical fiber transmission system according to an embodiment.

First, contents of an embodiment of the present invention will be individually described.

A multi-core optical fiber (MCF) according to the present embodiment comprises: at least one coupled-core group constituted by a plurality of cores; and a common cladding surrounding the coupled-core group. Particularly, as one aspect of the present embodiment, a core interval $\Lambda$ between centers of adjacent cores among the plurality of cores is set such that a mode coupling coefficient between the adjacent cores at a wavelength of 1550 nm is $2.6 \times 10^0$ $[m^{-1}]$ to $1.6 \times 10^2$ $[m^{-1}]$ or a power coupling coefficient between the adjacent cores at the wavelength of 1550 nm is $1.3 \times 10^{-3}$ $[m^{-1}]$ to $8.1 \times 10^0$ $[m^{-1}]$.

As one aspect of the present embodiment, the core interval Λ may be set such that the mode coupling coefficient between the adjacent cores at the wavelength of 1550 nm is $2.1 \times 10^1$ [m$^{-1}$] to $5.7 \times 10^1$ [m$^{-1}$] or the power coupling coefficient between the adjacent cores at the wavelength of 1550 nm is $1.0 \times 10^{-1}$ [m$^{-1}$] to $9.0 \times 10^{-1}$ [m$^{-1}$].

As one aspect of the present embodiment, the MCF preferably has a configuration to realize a low spatial mode dispersion (defined by a standard deviation of an autocorrelation function of an impulse response) in consideration of a fiber bending curvature at the time of cable formation. Specifically, as viewed macroscopically, fine fiber bending (microbending) and perturbation occur even when the MCF is set in a straight fiber condition (a fiber bending curvature is macroscopically zero). A virtual curvature $C_f$ [m$^{-1}$] of the MCT is a fiber bending curvature virtually represented by replacing the effect of these microbending and perturbation with the adding of a macroscopic fiber bending, and where the virtual curvature $C_f$ [m$^{-1}$] of the MCF in a straight fiber condition is defined by $C_f = C_{bend} \cdot h_b / h_s$ ($h_b$ shows a power coupling coefficient between cores in a state in which an optical fiber is bent at a curvature $C_{bend}$ of 5 [m$^{-1}$] or more and $h_s$ shows a power coupling coefficient between the cores in a state in which the optical fiber is held straight at a curvature of 0.1 [m$^{-1}$] or less), and an average value of a propagation constant of the adjacent cores in the coupled-core group is denoted by β [m$^{-1}$], the MCF preferably has a core structure and a core arrangement satisfying the following first to third conditions. The first condition is defined by setting a core interval Λ [m] between centers of the adjacent cores among the plurality of cores, such that a mode coupling coefficient κ [m$^{-1}$] between the adjacent cores at a wavelength of 1550 nm satisfies $1.6 \times 10^2$ [m$^{-1}$] or less. In addition, the second condition is defined by setting κ/(βΛ$C_f$) to become 0.1 or less in a wavelength range of 1530 to 1625 nm. In addition, the third condition is defined by setting κ to become $2.6 \times 10^0$ [m$^{-1}$] or more, or setting κ/(βΛ$C_f$) to become 0.01 or more in the wavelength range of 1530 to 1625 nm. Although not an essential requirement of this aspect, in addition to the definitions of the parameters described above, when an average value of the curvature of the MCF in a state in which the MCF is embedded in a cable, along a longitudinal direction of the MCF, is denoted by $C_{avg}$ [m$^{-1}$], the second condition may be defined by setting κ/(βΛ$C_{avg}$) to become 0.1 or less in the wavelength range of 1530 to 1625 nm, in the case in which $C_{avg}$ is set to 0.01 to 2 [m$^{-1}$] or 0.1 to 1 [m$^{-1}$]. In addition, the third condition may be defined by setting κ to become $2.6 \times 10^0$ [m$^{-1}$] or more and setting κ/(βΛ$C_{avg}$) to become 0.01 or more in the wavelength range of 1530 to 1625 nm.

As one aspect of the present embodiment, preferable characteristics of a coupling-type MCF for long distance transmission are described below. A transmission loss in full mode launch is preferably 0.20 dB/km or less, 0.18 dB/km or less, 0.16 dB/km or less, or 0.15 dB/km or less, in a wavelength range 1530 nm to 1565 nm or a wavelength range of 1460 nm to 1625 nm. A mode average of a chromatic dispersion is preferably 16 ps/(nm·km) or more. In all of spatial modes, a bending loss when the MCF is wound on a mandrel having a diameter of 30 mm by one turn is preferably 0.2 dB or less at a wavelength of 1550 nm. In all of spatial modes, a bending loss when the MCF is wound on a mandrel having a diameter of 20 mm is preferably 20 dB/m or less at the wavelength of 1550 nm. In all of spatial modes, a bending loss when the MCF is wound on a mandrel having a radius of 30 mm by 100 turns is preferably 0.5 dB or less at the wavelength of 1550 nm. In the wavelength range of 1530 nm to 1565 nm or the wavelength range of 1460 nm to 1625 nm, an average value of a mode dependent loss is preferably 0.01 dB/km$^{1/2}$ or less. In the wavelength range of 1530 nm to 1565 nm or the wavelength range of 1460 nm to 1625 nm, an average value of maximum values for respective wavelengths of a DGD between spatial modes is preferably 10 ps/km$^{1/2}$ or less.

As one aspect of the present embodiment, the common cladding includes a common optical cladding that covers all of the plurality of cores and a physical cladding that covers a surrounding portion of the optical cladding. Particularly, as a preferable core structure to realize the characteristics described above, an outer diameter of each of the plurality of cores is preferably 6 to 15 μm. Also, a difference of an index difference Δ of an average area of each of the plurality of cores and an index difference Δ of the optical cladding is preferably about 0.2 to 0.5%, and an index difference Δ of the physical cladding is preferably 0.0 to 1% higher than the index difference Δ of the optical cladding in a cross-section of the MCF orthogonal to the longitudinal direction, where all of the index differences Δ are expressed based on a refractive index of pure silica.

As one aspect of the present embodiment, a preferable structure of an MCF having a cladding of 125 μm is described below. That is, the coupled-core group is preferably constituted by 2 to 7 cores or 8 to 15 cores. An outer diameter of the physical cladding is preferably 125±1 μm. Also, the MCF satisfies a formula:

$$D_J/a \geq 7.68 \times 10^{-2} \cdot X^2 - 2.21 \times 10^{-1} \cdot X + 3.15; \text{ or}$$

$$D_J/a \geq 7.57 \times 10^{-2} \cdot X^2 - 2.25 \times 10^{-1} \cdot X + 3.40,$$

where $D_J$ denotes a shortest distance of the physical cladding and a center of a proximity core closest to the physical cladding, a character a denotes a radius of the proximity core, $D_{offset}$ denotes a distance of a center of the optical cladding and the center of the proximity core, and X denotes $\log_{10}(D_{offset}/a)$.

A multi-core optical fiber cable (MCF cable) according to the present embodiment has a structure to reduce a spatial mode dispersion and generates random spatial mode coupling by controlling fiber bending, a core structure, and a core pitch. As a result, a core number per fiber unit cross-sectional area can be increased while an accumulation of a DGD between spatial modes is reduced. Specifically, the MCF cable has a plurality of MCFs embedded therein. As one aspect of the present embodiment, each of the plurality of MCFs comprises: at least one coupled-core group constituted by a plurality of cores; and a common cladding surrounding the coupled-core group. The MCF preferably has a core structure and a core arrangement satisfying the following first to third conditions. The first condition is defined by setting a core interval Λ [m] between centers of the adjacent cores among the plurality of cores, such that a mode coupling coefficient κ [m$^{-1}$] between the adjacent cores at a wavelength of 1550 nm satisfies $1.6 \times 10^2$ [m$^{-1}$] or less. The second condition is defined by setting κ/(βΛ$C_{avg}$) or κ/(βΛ$C_f$) to become 0.1 or less in a wavelength range of 1530 to 1625 nm. The third condition is defined by setting κ to become $2.6 \times 10^0$ [m$^{-1}$] or more, or setting κ/(βΛ$C_{avg}$) or κ/(βΛ$C_f$) to become 0.01 or more in the wavelength range of 1530 to 1625 nm. Where $C_{avg}$ [m$^{-1}$] denotes an average value of a curvature of the MCF in a state in which the MCF is embedded in the MCF cable, along a longitudinal direction of the MCF, $C_f$ [m$^{-1}$] denotes a virtual curvature of the MCF in a straight fiber condition, and β [m$^{-1}$] denotes an average value of propagation constants of the adjacent cores.

As one aspect of the present embodiment, to further increase the core number per fiber unit cross-sectional area while reducing the accumulation of the DGD between the spatial modes, the core structure and the core arrangement in each of the plurality of MCFs embedded in the MCF cable are preferably adjusted such that $\kappa/(\beta \Lambda C_{avg})$ or $\kappa/(\beta \Lambda C_f)$ becomes 0.01 or more in the wavelength range of 1530 to 1625 nm.

As one aspect of the present embodiment, to realize the above characteristics when a fiber curvature in a cable suitable for long distance transmission is assumed, $C_{avg}$ is preferably 0.01 to 2 $[m^{-1}]$, in a state in which bending is not applied to the MCF cable. From the same reason, as one aspect of the present embodiment, $C_{avg}$ is preferably 0.1 $[m^{-1}]$ or more, 1 $[m^{-1}]$ or less, or 0.1 $[m^{-1}]$ to 1 $[m^{-1}]$, in a state in which bending is not applied to the MCF cable.

As one aspect of the present embodiment, preferable characteristics of a coupling-type MCF applicable to the MCF cable for the long distance transmission are described below. That is, in each of the plurality of MCFs embedded in the MCF cable, a transmission loss in full mode launch is preferably 0.20 dB/km or less, 0.18 dB/km or less, 0.16 dB/km or less, or 0.15 dB/km or less, in the wavelength range of 1530 nm to 1565 nm or the wavelength range of 1460 nm to 1625 nm. A mode average of a chromatic dispersion is preferably 16 ps/(nm·km) or more. In all of spatial modes, a bending loss when the MCF is wound on a mandrel having a diameter of 30 mm by one turn is preferably 0.2 dB or less at a wavelength of 1550 nm. In all of spatial modes, a bending loss when the MCF is wound on a mandrel having a diameter of 20 mm is preferably 20 dB/m or less at the wavelength of 1550 nm. In all of spatial modes, a bending loss when the MCF is wound on a mandrel having a radius of 30 mm by 100 turns is preferably 0.5 dB or less at the wavelength of 1550 nm. In the wavelength range of 1530 nm to 1565 nm or the wavelength range of 1460 nm to 1625 nm, an average value of a mode dependent loss is preferably 0.01 dB/km$^{1/2}$ or less. In the wavelength range of 1530 nm to 1565 nm or the wavelength range of 1460 nm to 1625 nm, an average value of a spatial mode dispersion is preferably 10 ps/km$^{1/2}$ or less.

As one aspect of an optical fiber transmission system according to the present embodiment, the optical fiber transmission system comprises: a transmission path including the MCFs or the MCF cables according to the various aspects; and a structure to compensate by MIMO signal processing for crosstalk between the spatial modes generated in the coupled-core group.

Each aspect listed in a column of "Description of embodiment of present invention" described above can be applied to each of the remaining aspects or all combinations of the remaining aspects.

Details of Embodiment of Present Invention

Hereinafter, specific examples of an MCF, an MCF cable, and an optical fiber transmission system according to the present invention will be described in detail with reference to the accompanying drawings. However, the present invention is not limited to the examples and all changes in the accompanying claims and their equivalents are included in the present invention.

FIG. 1 is a diagram illustrating a schematic configuration of an optical fiber transmission system according to the present embodiment. An optical fiber transmission system 1 illustrated in FIG. 1 includes an MCF 100 according to the present embodiment that is applied as a transmission path, a transmission station 10 that is disposed on one end side of the MCF 100, and a reception station 20 that is disposed on the other end side of the MCF 100. The MCF 100 is an MCF that includes at least one coupled-core group constituted by a plurality of cores mode-coupled to each other. A plurality of transmitters 11 (TX$_1$ to TX$_N$) and a connector component (fan-in-fan-out-device: FI/FO) 12 to guide optical signals from the plurality of transmitters 11 to each core of the MCF 100 are provided in the transmission station 10. In addition, a plurality of receivers 21 (RX$_1$ to RX$_N$) and a connector component (FI/FO) 22 to distribute individual propagation spatial modes of the MCF 100 to the corresponding receivers 21 are provided in the reception station 20. In addition, in the optical fiber transmission system 1, as a structure to compensate for crosstalk between the spatial modes generated in the coupled-core group of the MCF 100 by MIMO signal processing, a MIMO signal processing unit 13 to control each of the transmitters 11 is disposed in the transmission station 10 and a MIMO signal processing unit 23 to control each of the receivers 21 is disposed in the reception station 20.

Figure 2A:
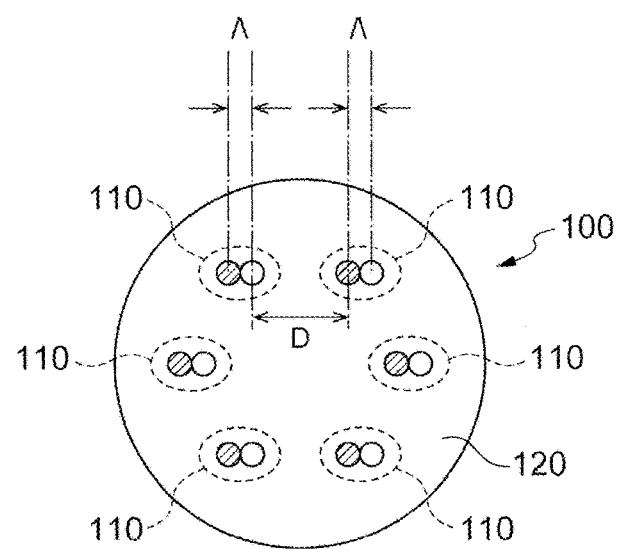
FIG. 2A is a diagram illustrating a cross-sectional structure of an MCF applicable to the optical fiber transmission system according to the present embodiment.

FIG. 2A illustrates a specific cross-sectional structure of the MCF 100. A cross-sectional view illustrated in FIG. 2A illustrates a cross section orthogonal to a longitudinal direction of the MCF 100. The MCF 100 includes coupled-core groups 110 and a common cladding 120 surrounding the coupled-core groups 110. The common cladding 120 includes an optical cladding covering all of a plurality of cores constituting each of the coupled-core groups 110 and a physical cladding covering the optical cladding. That is, in the cross-section of the MCF 100 illustrated in FIG. 2A, each region surrounded with a broken line is the optical cladding and a region outside each region surrounded with the broken line is the physical cladding.

Each coupled-core group 110 includes a plurality of cores in which adjacent cores are disposed at a predetermined core interval $\Lambda$ and are mode-coupled to each other. The core interval $\Lambda$ is defined by an inter-center distance of the adjacent cores in each coupled-core group 110. In addition, the number of coupled-core groups 110 may be one or plural. When the number of coupled-core groups 110 is plural, the coupled-core groups 110 are separated from each other by a sufficient distance D to enter a non-coupling state (low crosstalk).

Figure 2B:
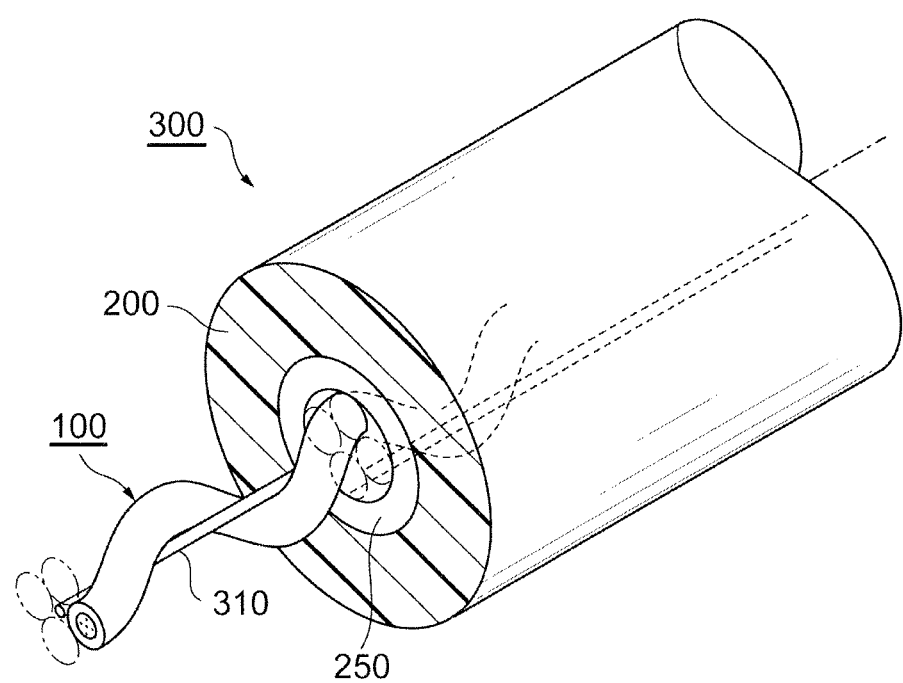
FIG. 2B is a diagram illustrating a cross-sectional structure of an MCF cable applicable to the optical fiber transmission system according to the present embodiment.

In addition, an MCF cable 300 in which a plurality of MCFs 100 having the structure described above are embedded may be laid between the transmission station 10 and the reception station 20. FIG. 2B is a diagram illustrating a configuration example of an MCF cable according to the present embodiment. As illustrated in FIG. 2B, the MCF cable 300 includes a support member 310, a plurality of MCFs 100 twisted in a spiral shape with the support member 310 as a center axis and wound on the support member 310 at a predetermined pitch, a strength member 250 wound on the plurality of MCFs 100 to hold a wound state, and a cable jacket 200 covering a surrounding portion of the strength member 250. In an example illustrated in FIG. 2B, the MCF cable 300 holds the four MCFs 100.

Even when the cable is held straight, each of the plurality of MCFs 100 is wound on the support member 310 at the predetermined pitch along a longitudinal direction thereof, so that bending of a constant curvature radius CR is applied. The cable jacket 200 covers the strength member 250 completely to protect the MCF 100 from external force. The strength member 250 may be an aramid fiber ("Kevlar (registered trademark)" manufactured by DU PONT-TORAY CO., LTD. or "Technora (registered trademark)"

manufactured by TEIJIN LIMITED), for example. By providing the strength member 250, extension and strain are hard to be applied to the MCF 100 when the MCF cable 300 is pulled and the MCF 100 can be protected from an external shock by a cushion effect.

The support member 310 may be a metal material such as a tension member and may be a contraction resisting material resisting contraction of the cable jacket 200. In an example of FIG. 2B, only one MCF 100 is illustrated for simplification. However, in actuality, all MCFs 100 included in the MCF cable 300 are wound on the support member 310.

Figure 3:
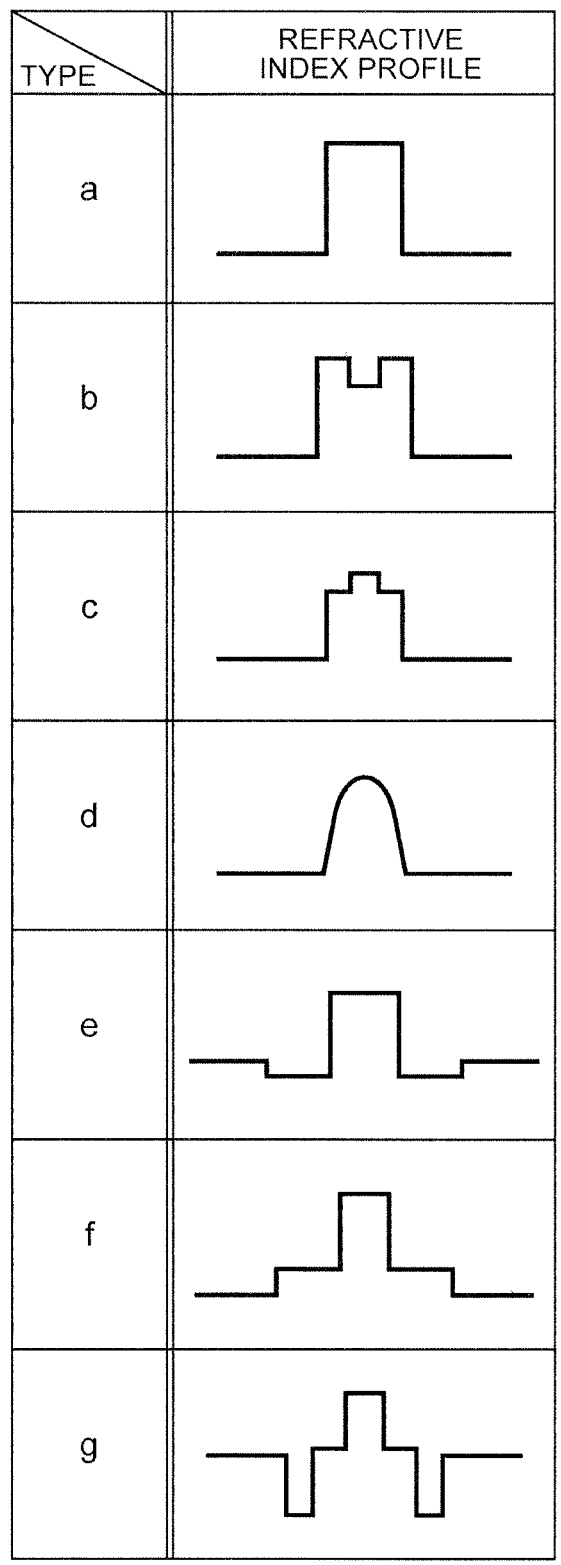
FIG. 3 is a table illustrating various types of refractive index profiles applicable to a region including a core and a part of a cladding around the core.

For a refractive index profile of each core or an optical characteristic according to the refractive index profile, an appropriate structure can be selected according to a use. However, structures of the individual cores may be the same and may be different. In addition, the number of cores in the cross-section of the MCF 100 is not limited and a cross-section diameter (glass diameter) of the MCF 100 and an external diameter of a coating resin provided on an outer circumferential surface of the common cladding can be appropriately set according to the number of cores embedded in the MCF 100. In a table of FIG. 3, various types of refractive index profiles applicable to a region including a core and a part of the cladding around the core are listed.

Specifically, a profile shape represented by (shape of refractive index profile of each core)/(shape of refractive index profile of optical cladding covering each core) is applicable to all of a step/matched type (type a), a tip recess step/matched type (type b), a tip protrusion step/matched type (type c), a graded/matched type (type d), a step/depressed type (type e), a dual step/matched type (type f), and a step/trench type (type g) and the refractive index profiles of the core and the cladding can be arbitrarily combined. In addition, each core may have a structure premised on a single mode operation in which the number of propagation modes of the core is one and may have a structure premised on a multi-mode operation of a plurality of propagation modes. However, when each core has the structure premised on the multi-mode operation, a power coupling coefficient between LP01s (fundamental modes) in the cores constituting each coupled-core group 110 is set to a power coupling coefficient between the adjacent cores.

Figure 4A:
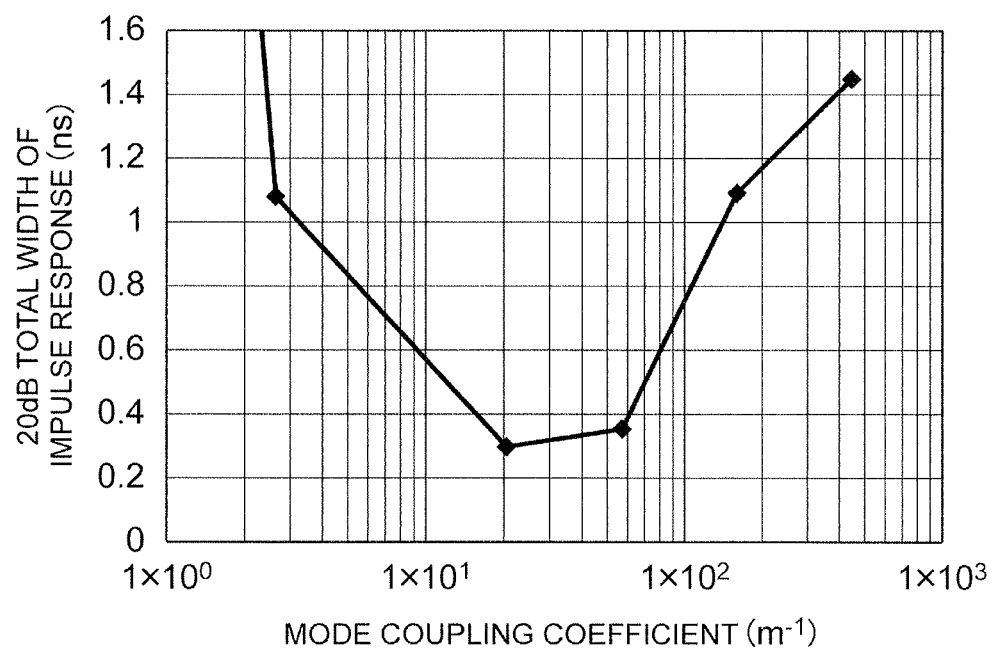
FIG. 4A is a graph illustrating an evaluation result of a 20 dB full width of an impulse response and a mode coupling coefficient.
Figure 4B:
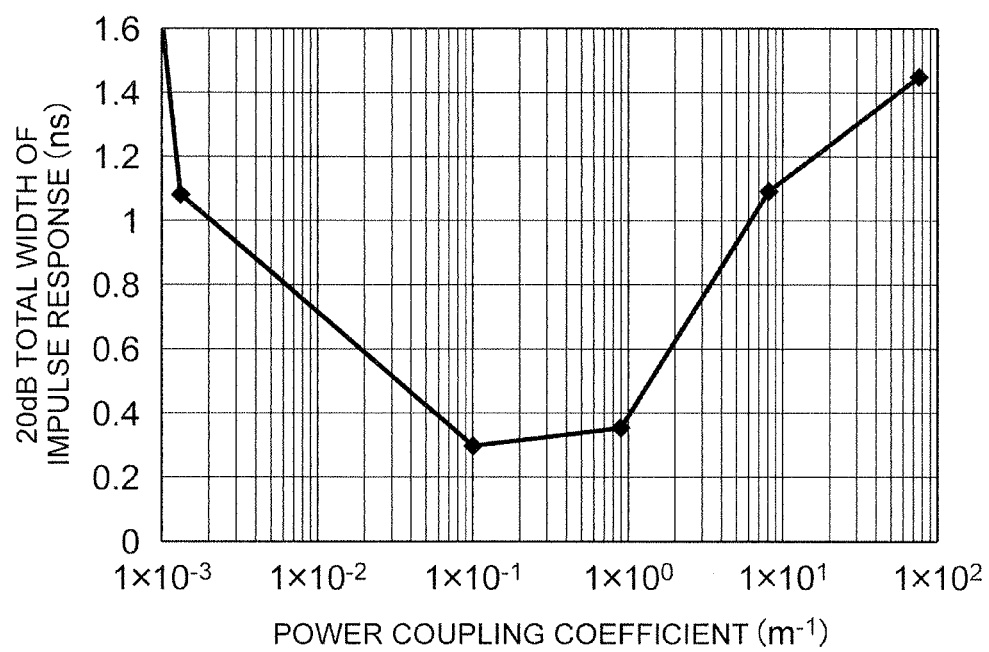
FIG. 4B is a graph illustrating an evaluation result of a 20 dB full width of an impulse response and a power coupling coefficient.

FIGS. 4A and 4B are graphs illustrating evaluation results of a 20 dB full width of an impulse response and a mode coupling coefficient and a power coupling coefficient, for a plurality of samples prepared as the coupled-core groups of the MCF 100 according to the present embodiment. Particularly, FIG. 4A is a graph illustrating a relation of the 20 dB full width [ns] (pulse total time width smaller by 20 dB than a maximum value) of the impulse response and the mode coupling coefficient $[m^{-1}]$ and FIG. 4B is a graph illustrating a relation of the 20 dB full width [ns] of the impulse response and the power coupling coefficient $[m^{-1}]$.

Each of prepared samples 1 to 6 is an MCF having the six coupled-core groups 110 and each coupled-core group 110 is constituted by two cores. In addition, a relative refractive index difference Δ of each core based on the common cladding 120 is 0.41% and a core diameter of each core is 9.0 μm. A core interval Λ in the sample 1 is 12.5 μm, a core interval Λ in the sample 2 is 15.0 μm, a core interval Λ in the sample 3 is 17.5 μm, a core interval Λ in the sample 4 is 20.0 μm, a core interval Λ in the sample 5 is 25.0 μm, and a core interval Λ in the sample 6 is 27.5 μm. In all of the samples 1 to 6, the six coupled-core groups 110 are separated from each other by a sufficient distance D to enter a non-coupling state.

In addition, in the samples 1 to 6, a fiber length is set to 66 m and the 20 dB full width of the impulse response at the wavelength of 1550 nm between the cores in each coupled-core group 110 is evaluated using optical frequency domain reflectometry (OFDR). In the OFDR, light is incident from one end of each of the samples 1 to 6 wound on a bobbin having a radius of 140 mm and a peak of Fresnel reflection at the other end is measured.

A calculation value of the mode coupling coefficient at the wavelength of 1550 nm between the cores in the coupled-core group 110 of each of the samples 1 to 6 having the structure described above is $4.5 \times 10^2$ $[m^{-1}]$ in the coupled-core group 110 of the sample 1 (Λ=12.5 μm), is $1.6 \times 10^2$ $[m^{-1}]$ in the coupled-core group 110 of the sample 2 (Λ=15.0 μm), is $5.7 \times 10^1$ $[m^{-1}]$ in the coupled-core group 110 of the sample 3 (Λ=17.5 μm), is $2.1 \times 10^1$ $[m^{-1}]$ in the coupled-core group 110 of the sample 4 (Λ=20.0 μm), is $2.6 \times 10^0$ $[m^{-1}]$ in the coupled-core group 110 of the sample 5 (Λ=25.0 μm), and is $9.4 \times 10^{-1}$ $[m^{-1}]$ in the coupled-core group 110 of the sample 6 (Λ=27.5 μm).

In addition, a calculation value of the power coupling coefficient at the wavelength of 1550 nm between the cores in the coupled-core group 110 of each of the samples 1 to 6 is $7.6 \times 10^1$ $[m^{-1}]$ in the coupled-core group 110 of the sample 1 (Λ=12.5 μm), is $8.1 \times 10^0$ $[m^{-1}]$ in the coupled-core group 110 of the sample 2 (Λ=15.0 μm), is $9.0 \times 10^{-1}$ $[m^{-1}]$ in the coupled-core group 110 of the sample 3 (Λ=17.5 μm), is $1.0 \times 10^{-1}$ $[m^{-1}]$ in the coupled-core group 110 of the sample 4 (Λ=20.0 μm), is $1.3 \times 10^{-3}$ $[m^{-1}]$ in the coupled-core group 110 of the sample 5 (Λ=25.0 μm), and is $1.5 \times 10^4$ $[m^{-1}]$ in the coupled-core group 110 of the sample 6 (Λ=27.5 μm).

From FIGS. 4A and 4B, the 20 dB full width of the impulse response increases rapidly in the coupled-core group of the sample 6. To realize a value equal to or smaller than 1.1 ns to be the same 20 dB full width of the impulse response as the coupled-core group of the sample 5 in which the rapid increase in the 20 dB full width of the impulse response does not occur, the mode coupling coefficient is preferably $2.6 \times 10^0$ $[m^{-1}]$ to $1.6 \times 10^2$ $[m^{-1}]$ and the power coupling coefficient is preferably $1.3 \times 10^{-3}$ $[m^{-1}]$ to $8.1 \times 10^0$ $[m^{-1}]$. In addition, to cause the 20 dB full width of the impulse response to become a value equal to or smaller than 0.4 ns of a lowest level, the mode coupling coefficient is more preferably $2.1 \times 10^1$ $[m^{-1}]$ to $5.7 \times 10^1$ $[m^{-1}]$ and the power coupling coefficient is more preferably $1.0 \times 10^{-1}$ $[m^{-1}]$ to $9.0 \times 10^{-1}$ $[m^{-1}]$. Therefore, in the MCF 100 according to the present embodiment, the core interval Λ in each coupled-core group 110 is preferably set to satisfy the above range of the mode coupling coefficient or the power coupling coefficient.

Appropriate bending is preferably applied to the MCF 100 according to the present embodiment. In addition, twisting with a center of the common cladding 120 (a center in a cross-section of the common cladding 120 orthogonal to the longitudinal direction of the MCF 100) as a rotation axis is preferably applied to the MCF 100 according to the present embodiment. The twisting may be applied in a state in which glass is melted during drawing of the optical fiber and may be applied in a state in which the glass is hardened after drawing the optical fiber.

Next, reduction of an accumulation of a DGD between the spatial modes is examined. It can be thought that, when a fiber length of the MCF is set to L and a is set to a proportional constant, the DGD between the spatial modes increases according to the following formula (1), with respect to the fiber length L.

[Formula 1]

$$DGD = aL^b \quad (1)$$

Figure 5A:
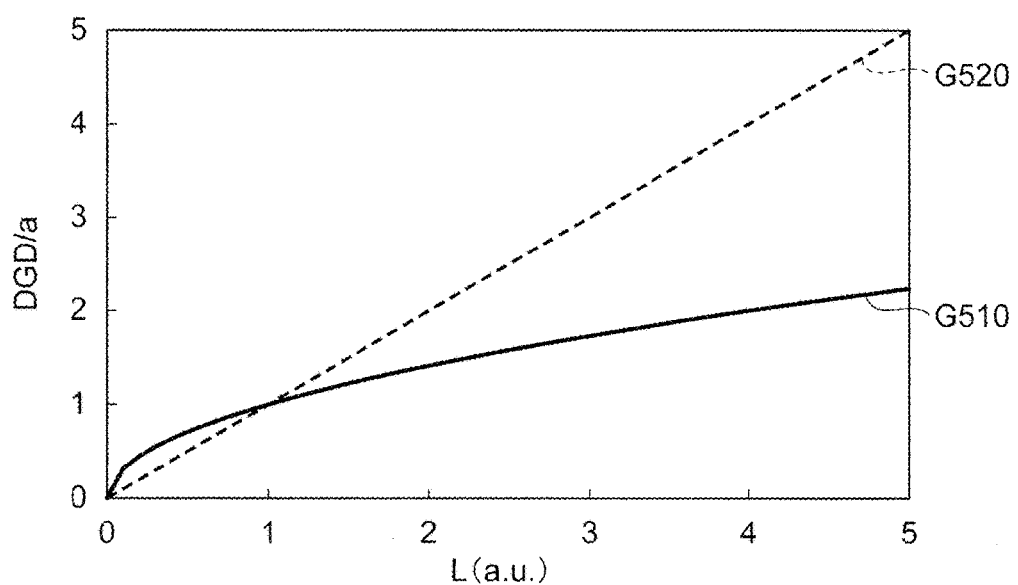

From an example of a polarization mode dispersion, it is known that b=1 in which the DGD between the spatial modes becomes largest is obtained when random coupling is not generated between the spatial modes, and an increase in the DGD between the spatial modes becomes gentle with respect to an increase in the fiber length L when sufficiently random coupling is generated between the spatial modes (b=0.5). FIG. 5A is a diagram illustrating a relation of DGD/a and the fiber length L. In FIG. 5A, a graph G510 illustrates a relation at the time of b=0.5 and a graph G520 illustrates a relation at the time of b=1.

Here, the inventors have checked what value b has by random simulation calculation, when the proportional constant a is set to a DGD scaling factor and b is set to a DGD growth rate. A simulation has been performed using a mode coupling equation of the core mode. A mode coupling equation of two cores (that is, a total of two modes) can be represented by the following formula (2), on the assumption that the polarization mode degenerates, and can be ignored, for simplification.

[Formula 2]

$$\frac{\partial}{\partial z}\begin{bmatrix} E_1(\omega, z) \\ E_2(\omega, z) \end{bmatrix} = -j\begin{bmatrix} \beta_1(\omega)\left(1 + \frac{\Lambda}{2}C(z)\cos\theta(z)\right) & \kappa(\omega) \\ \kappa(\omega) & \beta_2(\omega)\left(1 + \frac{\Lambda}{2}C(z)\cos\theta(z)\right) \end{bmatrix}\begin{bmatrix} E_1(\omega, z) \\ E_2(\omega, z) \end{bmatrix} \quad (2)$$

Here, $\kappa$ shows a mode coupling coefficient between cores, $\beta$ shows a propagation constant of each core, $\Lambda$ shows a core interval (a center interval between cores), C shows a curvature of a fiber (reciprocal of a bending radius), and $\theta$ shows a rotation angle of a fiber for a bending direction when taken for a certain standard. In addition, an index (subscript) of each parameter shows a core number. If the formula (2) is solved, a transfer equation of z=0 to z=L like the following formula (3) can be acquired.

[Formula 3]

$$\begin{bmatrix} E_1(\omega, z=L) \\ E_2(\omega, z=L) \end{bmatrix} = T\begin{bmatrix} E_1(\omega, z=0) \\ E_2(\omega, z=0) \end{bmatrix} \quad (3)$$

Here, T shows a transfer matrix of core number (total mode number)×core number (total mode number). An eigenvalue of a group-delay operator matrix is acquired by transforming the transfer matrix T in a form of a group-delay operator described in Non-Patent Literature 1 (S. Fan and J. M. Kahn, "Principal modes in multimode waveguides", Opt. Lett. 30(2), 135-137 (2005)) and the DGD between the spatial modes can be simulated by taking a difference of a maximum value and a minimum value thereof.

Figure 5B:
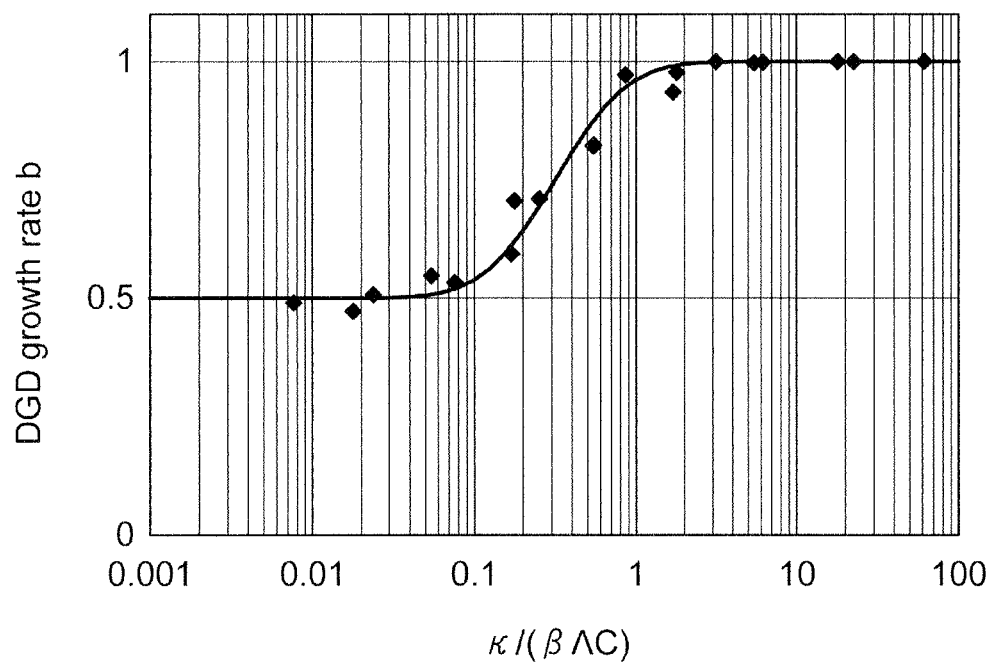
FIG. 5B is a graph illustrating a relation of the parameter b of the formula (1) and $\kappa/(\beta\Lambda C)$.

FIG. 5B illustrates a calculation result of change rates of $\Lambda$, C, and $\theta$ for z at a plurality of levels in the wavelength range of 1530 to 1625 nm by the above method. It can be thought that a mode coupling coefficient between the adjacent cores is $\kappa$, a propagation constant of each adjacent core is $\beta$ (here, it is assumed that the propagation constant is the same in two cores), and a core interval (center interval between the adjacent cores) is $\Lambda$. From the result of FIG. 5B, it is known that a DGD growth rate b shows clear dependency for $\kappa/(\beta\Lambda C)$. Here, $\kappa$ to be a numerator of $\kappa/(\beta\Lambda C)$ shows coupling of electric field amplitudes of the two adjacent cores as known from that $\kappa$ is included in non-diagonal elements of the above formula (2) and ($\beta\Lambda C$) to be a denominator shows a maximum value of a difference of equivalent propagation constants affected by bending to be a diagonal element. When $\kappa/(\beta\Lambda C)$ is equal to or smaller than 0.1, b takes a value near 0.5, when $\kappa/(\beta\Lambda C)$ approaches from 0.1 to 1, b approaches to 1, and when $\kappa/(\beta\Lambda C)$ is equal to or larger than 1, b becomes 1. From this, to reduce the DGD between the spatial modes, it is necessary to adjust a core structure and a core arrangement to cause $\kappa/(\beta\Lambda C)$ to become equal to or smaller than 0.1. That is, to reduce the DGD between the spatial modes, $\kappa/(\beta\Lambda C)$ is preferably equal to or smaller than 0.1.

From the above result, when the propagation constant difference slightly changes along the longitudinal direction of the MCF or mode coupling between the cores is excessively strong ($\beta\Lambda C \ll \kappa$, that is, $\kappa/(\beta\Lambda C) \gg 1$)), for stable propagation of super modes in which the core modes are coupled, the super modes are not coupled and a DGD between the super modes accumulates at b=1. Meanwhile, when the mode coupling coefficient between the cores is in an appropriate range and the propagation constant difference changes along the longitudinal direction of the MCF ($\beta\Lambda C$ to be a maximum value of the change is large, that is, $\kappa(\beta\Lambda C)$ is small), random coupling between the spatial modes is generated, b approaches to 0.5, and an accumulation of the DGD between the spatial modes becomes gentle.

Therefore, when an average value of the curvature of the MCF in the cable along the fiber longitudinal direction of the MCF is set to $C_{avg}$ [m$^{-1}$], a mode coupling coefficient between the adjacent cores in the coupled-core group is set to $\kappa$ [m$^{-1}$], an average value of propagation constants between the adjacent cores in the coupled-core group is set to $\beta$ [m$^{-1}$], and a core center interval between the adjacent cores in the coupled-core group is set to $\Lambda$ [m], the accumulation of the DGD between the spatial modes in the MCF cable can be reduced by embedding the MCF in which the core structure and the core arrangement are adjusted such that $\kappa/(\beta\Lambda C_{avg})$ becomes 0.1 or less in the wavelength range of 1530 to 1625 nm. When the core interval increases, $\kappa/(\beta\Lambda C_{avg})$ decreases. For this reason, when $\kappa/(\beta\Lambda C_{avg})$ decreases excessively, a core density decreases and core coupling becomes weak and mode coupling becomes very weak. In this case, sufficient random mode coupling necessary for reducing the DGD between the spatial modes is not generated. Therefore, $\kappa/(\beta\Lambda C_{avg})$ is preferably 0.01 or more. At this time, $C_{avg}$ may be an average value of curvatures applied to the MCF after sufficient control and may be an average value of curvatures including an unintentionally applied curvature.

Referring to Non-Patent Literature 2 (M. Koshiba, K. Saitoh, K. Takenaga, and S. Matsuo, "Analytical expression of average power-coupling coefficients for estimating inter-core crosstalk in multicore fibers", IEEE Photon. J. 4(5), 1987-1995 (2012)) and Non-Patent Literature 3 (T. Hayashi, T. Sasaki, E. Sasaoka, K. Saitoh, and M. Koshiba, "Physical interpretation of intercore crosstalk in multicore fiber: effects of macrobend, structure fluctuation, and macrobend", Opt. Express 21(5), 5401-5412 (2013)), it is thought that, even when the MCF is in a straight fiber condition (even when actual C is 0), a change of an inter-core propagation constant difference along the longitudinal direction of the MCF, which is substantially equal to that in the case in which C of 0.01 to 1 [m$^{-1}$] or 0.1 to 1 [m$^{-1}$] is applied, is generated by a change of a fiber structure along the longitudinal direction or microbend. The curvature C when the optical fiber is held straight can be estimated by a virtual curvature $C_f$ [m$^{-1}$]=$C_{bend}·h_b/h_s$ ($h_b$ shows a power coupling coefficient between the cores in a state in which the optical fiber is bent at a curvature $C_{bend}$ of 5 [m$^{-1}$] or more and $h_s$ shows a power coupling coefficient between the cores in a state in which the optical fiber is held straight at a curvature of 0.1 [m$^{-1}$] or less and the accumulation of the DGD between the spatial modes in the MCF cable can be reduced by embedding the MCF in which the core structure and the core arrangement are adjusted such that $κ/(βΛC_f)$ becomes 0.1 or less in the wavelength range of 1530 to 1625 nm. When the core interval increases, $κ/(βΛC_f)$ decreases. For this reason, when $κ/(βΛC_f)$ decreases excessively, a core density decreases and core coupling becomes weak and mode coupling becomes very weak. In this case, sufficient random mode coupling necessary for reducing the DGD between the spatial modes is not generated. Therefore, $κ/(βΛC_f)$ is preferably 0.01 or more.

Hereinafter, samples of the MCF according to the present embodiment and a comparative example will be described in connection with a lower limit of $κ/(βΛC_{avg})$.

Each of the samples trial-produced as the MCF according to the present embodiment includes 2 to 7 cores that have a ring-type refractive index profile, a common optical cladding that covers the cores, and a physical cladding that covers the optical cladding and has an outer diameter of 125 μm. An outer diameter of the cores is set to about 11.3 μm and when a relative refractive index difference based on a refractive index of pure silica is set to Δ, a difference of Δ of an average area of the cores and Δ of the optical cladding is about 0.34%, Δ of the physical cladding is higher than Δ of the optical cladding, and a difference of Δ of the physical cladding and Δ of the optical cladding is 0.05 to 0.1%. When a shortest distance of the physical cladding and a center of a proximity core closest to the physical cladding is set to $D_1$, a radius of the proximity core is set to a, a distance of the proximity core and a center of the optical cladding is set to $D_{offset}$, and $X=\log_{10}(D_{offset}/a)$ is set, the MCF satisfies a formula:

$$D_J/a \geq 7.68 \times 10^{-2} \cdot X^2 - 2.21 \times 10^{-1} \cdot X + 3.15; \text{ or}$$

$$D_J/a \geq 7.57 \times 10^{-2} \cdot X^2 - 2.25 \times 10^{-1} \cdot X + 3.40.$$

In the samples of the MCF, about 6.1 ps/km$^{1/2}$ is obtained as a measurement result of a value of a spatial mode dispersion (root-mean-square of the DGD between the spatial modes) when $κ/(βΛC)$ is adjusted to become $2.7 \times 10^{-2}$.

Meanwhile, in the comparative example, about 32 ps/km$^{1/2}$ is obtained as a measurement result of a value of a spatial mode dispersion when $κ/(βΛC)$ is adjusted to become $2 \times 10^{-3}$ to $3 \times 10^{-3}$ and the value of the spatial mode dispersion becomes larger by almost five times than the value of the spatial mode dispersion in the samples of the MCF according to the present embodiment in which $κ/(βΛC)$ is 0.01 or more.

In the MCF according to the present embodiment, the core and the common cladding are preferably made of glass or silica glass. In addition, a surrounding portion of the common cladding may be covered with a protection material made of a resin, a metal, and carbon. A minute amount of alkali metal may be added to the glass of each core.

As a preferable characteristic to improve an optical signal to noise ratio at the time of long distance transmission, a transmission loss in full mode launch is preferably 0.20 dB/km or less, 0.18 dB/km or less, 0.16 dB/km or less, or 0.15 dB/km or less in the wavelength range of 1530 nm to 1565 nm or the wavelength range of 1460 nm to 1625 nm. A mode average of a chromatic dispersion is preferably 16 ps/(nm·km) or more. In all of spatial modes, a bending loss when the MCF is wound on a mandrel having a diameter of 30 mm by one turn is preferably 0.2 dB or less at a wavelength of 1550 nm. In all of spatial modes, a bending loss when the MCF is wound on a mandrel having a diameter of 20 mm is preferably 20 dB/m or less at the wavelength of 1550 nm. In all of spatial modes, a bending loss when the MCF is wound on a mandrel having a radius of 30 mm by 100 turns is preferably 0.5 dB or less at the wavelength of 1550 nm. In the wavelength range of 1530 nm to 1565 nm or the wavelength range of 1460 nm to 1625 nm, an average value of a mode dependent loss is preferably 0.01 dB/km$^{1/2}$ or less. In the wavelength range of 1530 nm to 1565 nm or the wavelength range of 1460 nm to 1625 nm, an average value of maximum values for respective wavelengths of a DGD between spatial modes is preferably 10 ps/km$^{1/2}$ or less. For all MCF cable in which the plurality of MCFs having the characteristics described above are embedded, in the wavelength range of 1530 nm to 1565 Inn or the wavelength range of 1460 nm to 1625 nm, an average value of a spatial mode dispersion is 10 ps/km$^{1/2}$ or less.

As a preferable characteristic of the MCF according to the present embodiment, under a situation where external stress is applied, an effective area of spatial modes localized in each core is preferably 60 μm$^2$ to 180 μm$^2$ in all of spatial modes to improve the optical signal to noise ratio at the time of the long distance transmission.

As a configuration to obtain the preferable characteristic, in the MCF according to the present embodiment, the common cladding preferably includes a common optical cladding that covers all of a plurality of cores constituting the coupled-core group and a physical cladding that covers a surrounding portion of the optical cladding. Particularly, as a preferable core structure to realize the above characteristic, an outer diameter of each of the plurality of cores is preferably 6 to 15 μm. In a cross-section of the MCF orthogonal to the longitudinal direction, when a relative refractive index difference based on a refractive index of pure silica is set to Δ, a difference of Δ of an average area of each of the plurality of cores and Δ of the optical cladding is preferably about 0.2 to 0.5%, Δ of the physical cladding is preferably higher than Δ of the optical cladding, and a difference of Δ of the physical cladding and Δ of the optical cladding is preferably 0.0 to 1%, 0.0 to 0.5%, or 0.0 to 0.35%.

The MCF according to the present embodiment satisfying the core structure described above preferably has the following structure to increase the number of cores in the physical cladding having an outer diameter of 125 μm. That is, the coupled-core group is constituted by 2 to 7 cores or 8 to 15 cores. The outer diameter of the physical cladding is 125±1 μm. To suppress a transmission loss from increasing due to an OH group of the physical cladding or an interface of the optical cladding and the physical cladding, where a shortest distance of the physical cladding and a center of a proximity core closest to the physical cladding is set to $D_J$, a radius of the proximity core is set to a, a distance of a center of the optical cladding and the center of the proximity core is set to $D_{offset}$, and $X=\log_{10}(D_{offset}/a)$ is set, it is preferable that the MCF satisfies a formula:

$D_J/a \geq 7.68 \times 10^{-2} \cdot X^2 - 2.21 \times 10^{-1} \cdot X + 3.15$; or $D_J/a \geq 7.57 \times 10^{-2} \cdot X^2 - 2.25 \times 10^{-1} \cdot X + 3.40$.

According to the present embodiment, an MCF in which the strength of mode coupling or power coupling between adjacent cores included in one coupled-core group is set to an appropriate level to reduce a DGD between spatial modes is obtained.

What is claimed is:

1. A multi-core optical fiber comprising:
   at least one coupled-core group constituted by a plurality of cores; and
   a common cladding surrounding the coupled-core group,
   wherein a core interval Λ between centers of adjacent cores among the plurality of cores is set such that a mode coupling coefficient between the adjacent cores at a wavelength of 1550 nm is $2.6 \times 10^0$ [m$^{-1}$] to $1.6 \times 10^2$ [m$^{-1}$] or a power coupling coefficient between the adjacent cores at the wavelength of 1550 nm is $1.3 \times 10^{-3}$ [m$^{-1}$] to $8.1 \times 10^0$ [m$^{-1}$].

2. The multi-core optical fiber according to claim 1, wherein
   the core interval Λ is set such that the mode coupling coefficient between the adjacent cores at the wavelength of 1550 nm is $2.1 \times 10^1$ [m$^{-1}$] to $5.7 \times 10^1$ [m$^{-1}$] or the power coupling coefficient between the adjacent cores at the wavelength of 1550 nm is $1.0 \times 10^{-1}$ [m$^{-1}$] to $9.0 \times 10^{-1}$ [m$^{-1}$].

3. An optical fiber transmission system comprising:
   a transmission path including the multi-core optical fiber according to claim 1; and
   a structure to compensate by MIMO signal processing for crosstalk between the spatial modes generated in the coupled-core group.

4. A multi-core optical fiber comprising:
   at least one coupled-core group constituted by a plurality of cores; and
   a common cladding surrounding the coupled-core group,
   wherein the multi-core optical fiber has a core structure and a core arrangement satisfying following first to third conditions:
   the first condition defined such that a core interval Λ [m] between centers of adjacent cores among the plurality of cores is set such that a mode coupling coefficient κ[m$^{-1}$] between the adjacent cores at a wavelength of 1550 nm satisfies $1.6 \times 10^2$ [m$^{-1}$] or less;
   the second condition defined such that $\kappa/(\beta \Lambda C_{avg})$ or $\kappa/(\beta \Lambda C_f)$ becomes 0.1 or less in a wavelength range of 1530 to 1625 nm when $C_{avg}$ is set to 0.01 to 2 [m$^{-1}$] or 0.1 to 1 [m$^{-1}$]; and
   the third condition defined κ becomes $2.6 \times 10^0$ [m$^{-1}$] or more, or, $\kappa/(\beta \Lambda C_{avg})$ or $\kappa/(\beta \Lambda C_f)$ becomes 0.01 or more in the wavelength range of 1530 to 1625 nm,
   where $C_{avg}$ [m$^{-1}$] denotes an average value of a curvature of the multi-core optical fiber in a state in which the multi-core optical fiber is embedded in a cable, along a longitudinal direction of the multi-core optical fiber, $C_f$ [m$^{-1}$] denotes a virtual curvature of the multi-core optical fiber in a straight fiber condition, and β [m$^{-1}$] denotes an average value of propagation constants of the adjacent cores.

5. The multi-core optical fiber according to claim 4, wherein
   a transmission loss in full mode launch is 0.20 dB/km or less in a wavelength range of 1530 nm to 1565 nm or a wavelength range of 1460 nm to 1625 nm,
   a mode average of a chromatic dispersion is 16 ps/(nm·km) or more,
   in all of spatial modes, a bending loss when the multi-core optical fiber is wound on a mandrel having a diameter of 30 mm by one turn is 0.2 dB or less at a wavelength of 1550 nm,
   in all of spatial modes, a bending loss when the multi-core optical fiber is wound on a mandrel having a diameter of 20 mm is 20 dB/m or less at the wavelength of 1550 nm,
   in all of spatial modes, a bending loss when the multi-core optical fiber is wound on a mandrel having a radius of 30 mm by 100 turns is 0.5 dB or less at the wavelength of 1550 nm,
   in the wavelength range of 1530 nm to 1565 nm or the wavelength range of 1460 nm to 1625 nm, an average value of a mode dependent loss is 0.01 dB/km$^{1/2}$ or less, and
   in the wavelength range of 1530 nm to 1565 nm or the wavelength range of 1460 nm to 1625 nm, an average value of maximum values for respective wavelengths of a differential group delay between spatial modes is 10 ps/km$^{1/2}$ or less.

6. The multi-core optical fiber according to claim 4, wherein
   the common cladding includes: a common optical cladding that covers all of the plurality of cores; and a physical cladding that covers a periphery of the optical cladding,
   an outer diameter of each of the plurality of cores is 6 to 15 μm, and
   a difference of an index difference Λ of an average area of each of the plurality of cores and an index difference Λ of the optical cladding is 0.2 to 0.5%, an index difference Λ of the physical cladding is 0.0 to 1% higher than the index difference Λ of the optical cladding in a cross-section of the multi-core optical fiber orthogonal to the longitudinal direction, where all of the index differences Λ are expressed based on a refractive index of pure silica.

7. The multi-core optical fiber according to claim 6, wherein
   the coupled-core group is constituted by 2 to 15 cores,
   an outer diameter of the physical cladding is 125±1 μm, and
   the multi-core optical fiber satisfies a formula:

$D_J/a \geq 7.68 \times 10^{-2} \cdot X^2 - 2.21 \times 10^{-1} \cdot X + 3.15$; or $D_J/a \geq 7.57 \times 10^{-2} \cdot X^2 - 2.25 \times 10^{-1} \cdot X + 3.40$, where $D_J$ denotes a shortest distance of the physical cladding and a center of a proximity core closest to the physical cladding, $D_{offset}$ denotes a distance of a center of the optical cladding and the center of the proximity core, a character a denotes a radius of the proximity core, and X denotes $\log_{10}(D_{offset}/a)$.

8. A multi-core optical fiber cable in which a plurality of multi-core optical fibers are embedded, each of the plurality of multi-core optical fibers comprises:
   at least one coupled-core group constituted by a plurality of cores; and
   a common cladding surrounding the coupled-core group,
   wherein the multi-core optical fiber has a core structure and a core arrangement satisfying following first to third conditions:
   the first condition defined such that a core interval Λ [m] between centers of the adjacent cores among the plurality of cores is set such that a mode coupling coefficient $\kappa$ [m$^{-1}$] between the adjacent cores at a wavelength of 1550 nm satisfies $1.6 \times 10^2$ [m$^{-1}$] or less;

the second condition defined such that $\kappa/(\beta\Lambda C_{avg})$ or $\kappa/(\beta\Lambda C_f)$ becomes 0.1 or less in a wavelength range of 1530 to 1625 nm; and the third condition defined such that $\kappa$ becomes $2.6 \times 10^0$ [m$^{-1}$] or more, or, $\kappa/(\beta\Lambda C_{avg})$ or $\kappa/(\beta\Lambda C_f)$ becomes 0.01 or more in the wavelength range of 1530 to 1625 nm, where $C_{avg}$ [m$^1$] denotes an average value of a curvature of the multi-core optical fiber in a state in which the multi-core optical fiber is embedded in the multi-core optical fiber cable, along a longitudinal direction of the multi-core optical fiber, $C_f$ [m$^{-1}$] denotes a virtual curvature of the multi-core optical fiber in a straight fiber condition, and $\beta$ [m$^{-1}$] denotes an average value of propagation constants of the adjacent cores.

9. The multi-core optical fiber cable according to claim 8, wherein the core structure and the core arrangement in each of the plurality of multi-core optical fibers are adjusted such that $\kappa/(\beta\Lambda C_{avg})$ or $\kappa/(\beta\Lambda C_f)$ becomes 0.01 or more in the wavelength range of 1530 to 1625 nm.

10. The multi-core optical fiber cable according to claim 8, wherein $C_{avg}$ is 0.01 to 2 [m$^{-1}$], in a state in which the multi-core optical fiber cable is not bent.

11. The multi-core optical fiber cable according to claim 8, wherein $C_{avg}$ is 0.1 [m$^{-1}$] or more, 1 [m$^{-1}$] or less, or 0.1 [m$^{1^n}$] to 1 [m$^{-1}$], in a state in which the multi-core optical fiber cable is not bent.

12. The multi-core optical fiber cable according to claim 8, wherein in each of the plurality of multi-core optical fibers, a transmission loss in full mode launch is 0.20 dB/km or less in a wavelength range of 1530 nm to 1565 nm or a wavelength range of 1460 nm to 1625 nm, a mode average of a chromatic dispersion is 16 ps/(nm·km) or more, in all of spatial modes, a bending loss when the multi-core optical fiber is wound on a mandrel having a diameter of 30 mm by one turn is 0.2 dB or less at a wavelength of 1550 nm, in all of spatial modes, a bending loss when the multi-core optical fiber is wound on a mandrel having a diameter of 20 mm is 20 dB/m or less at the wavelength of 1550 nm, in all of spatial modes, a bending loss when the multi-core optical fiber is wound on a mandrel having a radius of 30 mm by 100 turns is 0.5 dB or less at the wavelength of 1550 nm, in the wavelength range of 1530 nm to 1565 nm or the wavelength range of 1460 nm to 1625 nm, an average value of a mode dependent loss is 0.01 dB/km$^{1/2}$ or less, and in the wavelength range of 1530 nm to 1565 nm or the wavelength range of 1460 nm to 1625 nm, an average value of a spatial mode dispersion is 10 ps/km$^{1/2}$ or less.

13. An optical fiber transmission system comprising:

a transmission path including the multi-core optical fiber cable according to claim 8; and a structure to compensate by MIMO signal processing for crosstalk between the spatial modes generated in the coupled-core group.

* * * * *